(12) United States Patent
Yamazaki et al.

(10) Patent No.: US 10,843,737 B2
(45) Date of Patent: Nov. 24, 2020

(54) METHOD FOR MANUFACTURING VEHICLE BODY MEMBER AND VEHICLE BODY MEMBER FOR VEHICLE

(71) Applicant: MAZDA MOTOR CORPORATION, Hiroshima (JP)

(72) Inventors: Tadashi Yamazaki, Hiroshima (JP); Toshiyuki Gendo, Hiroshima (JP); Naoyuki Irie, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 93 days.

(21) Appl. No.: 16/200,963

(22) Filed: Nov. 27, 2018

(65) Prior Publication Data

US 2019/0168811 A1 Jun. 6, 2019

(30) Foreign Application Priority Data

Dec. 4, 2017 (JP) ................... 2017-232495

(51) Int. Cl.
*B62D 25/04* (2006.01)
*B62D 27/02* (2006.01)
(Continued)

(52) U.S. Cl.
CPC .......... *B62D 25/04* (2013.01); *B21D 22/203* (2013.01); *B21D 35/007* (2013.01);
(Continued)

(58) Field of Classification Search
CPC ...... B62D 25/04; B62D 27/02; B62D 29/008; B62D 29/007; B21D 22/203;
(Continued)

(56) References Cited

U.S. PATENT DOCUMENTS 9,815,498 B2 * 11/2017 Yamamoto ............ B62D 25/04
2002/0003054 A1 1/2002 Kamada et al.
(Continued)

FOREIGN PATENT DOCUMENTS

DE 10 2004 051 848 B3 1/2006
EP 0 904 868 A1 3/1999
(Continued)

*Primary Examiner* — Joseph D. Pape
*Assistant Examiner* — Dana D Ivey
(74) *Attorney, Agent, or Firm* — Studebaker & Brackett PC (57) ABSTRACT

A method for manufacturing a vehicle body member from a joined sheet. The joined sheet is press formed into a vehicle body member with a predetermined shape by: welding a second sheet material to a first sheet material at a plurality of points including a first joint and a second joint separated from each other; press forming the joined sheet so that a ridge crossing an imaginary line segment connecting the first joint and the second joint is formed in a portion where the first sheet material overlaps the second sheet material; and before the joining step, forming a displacement facilitating portion, which facilitates displacement of the second sheet material relative to the first sheet material in a longitudinal direction of the imaginary line segment, in a portion corresponding to between the first joint and the second joint in the second sheet material.

18 Claims, 10 Drawing Sheets

(51) Int. Cl.
    *B23K 31/00*     (2006.01)
    *B23K 31/10*     (2006.01)
    *B21D 22/20*     (2006.01)
    *B21D 35/00*     (2006.01)
    B23K 103/04     (2006.01)
    B23K 101/00     (2006.01)
    B62D 29/00     (2006.01)

(52) U.S. Cl.
    CPC ............ B23K 31/003 (2013.01); B23K 31/10 (2013.01); B62D 27/02 (2013.01); *B23K 2101/006* (2018.08); *B23K 2103/04* (2018.08); *B62D 29/007* (2013.01)

(58) Field of Classification Search
    CPC .... B21D 35/007; B23K 31/003; B23K 31/10; B23K 2103/04; B23K 2101/006
    USPC ....................................... 296/193.06
    See application file for complete search history.

(56) References Cited

U.S. PATENT DOCUMENTS

| | | |
|---|---|---|
| 2002/0069506 A1 | 6/2002 | Brodt et al. |
| 2014/0147693 A1* | 5/2014 | Yasuyama ............ B62D 21/157 428/594 |
| 2015/0028625 A1 | 1/2015 | Pohl |

FOREIGN PATENT DOCUMENTS

| | | |
|---|---|---|
| EP | 1 195 208 A2 | 4/2002 |
| JP | 2002-059218 A | 2/2002 |
| JP | 2017-140636 A | 8/2017 |
| WO | 2012/036262 A1 | 3/2012 |

* cited by examiner

METHOD FOR MANUFACTURING VEHICLE BODY MEMBER AND VEHICLE BODY MEMBER FOR VEHICLE

CROSS-REFERENCE TO RELATED APPLICATION

This application claims priority to Japanese Patent Application No. 2017-232495 filed on Dec. 4, 2017, the entire disclosure of which is incorporated by reference herein.

BACKGROUND

The present disclosure relates to vehicle body members for vehicles which are formed by a plurality of sheet materials placed on top of each other and methods for manufacturing the same, and belongs to the production engineering field of vehicle bodies.

Members formed by press forming steel sheets are widely used as vehicle body members that form bodies of automobiles. For the bodies of the automobiles, there are cases where a reinforcing member (patch) is placed on and joined to a part of a body member to reinforce the vehicle body member. When manufacturing this type of vehicle body member, the reinforcing member is usually joined to a predetermined part of the body member by welding after each of the body member and the reinforcing member is press formed.

Another technique of manufacturing a vehicle body member is also known in the art. In this technique, after flat sheet materials 201, 202 before press forming are joined together by welding as shown in, e.g., the left figure in FIG. 9, the joined sheet material 201, 202 is press formed so as to form ridges R0 as shown in, e.g., the right figure in FIG. 9, whereby a vehicle body member 200 is manufactured. This technique is advantageous as it improves formability that allows the one sheet material 201 to conform to the shape of the other sheet material 202 and reduces the number of person-hours required for press forming as compared to the case where the members individually formed by press forming are joined together.

Japanese Unexamined Patent Publication No. 2017-140636 discloses as an example of this type of forming method a hot press forming technique in which a joining process of joining two sheet materials by welding, a heating process of heating the joined sheet material obtained by the joining process, and a forming process of press forming the heated joined sheet material are sequentially performed. With this hot press forming, even when high tensile steel sheets with poor cold formability etc. are used as the sheet materials, more satisfactory formability can be easily achieved because formability of the joined sheet material is improved by the heating process and the forming process is performed on the joined sheet material having improved formability.

SUMMARY

When press forming two sheet materials that have been joined in advance by welding, a weld may be deformed during press forming depending on the positional relationship between a ridge formed by press forming and the weld.

Figure 9:
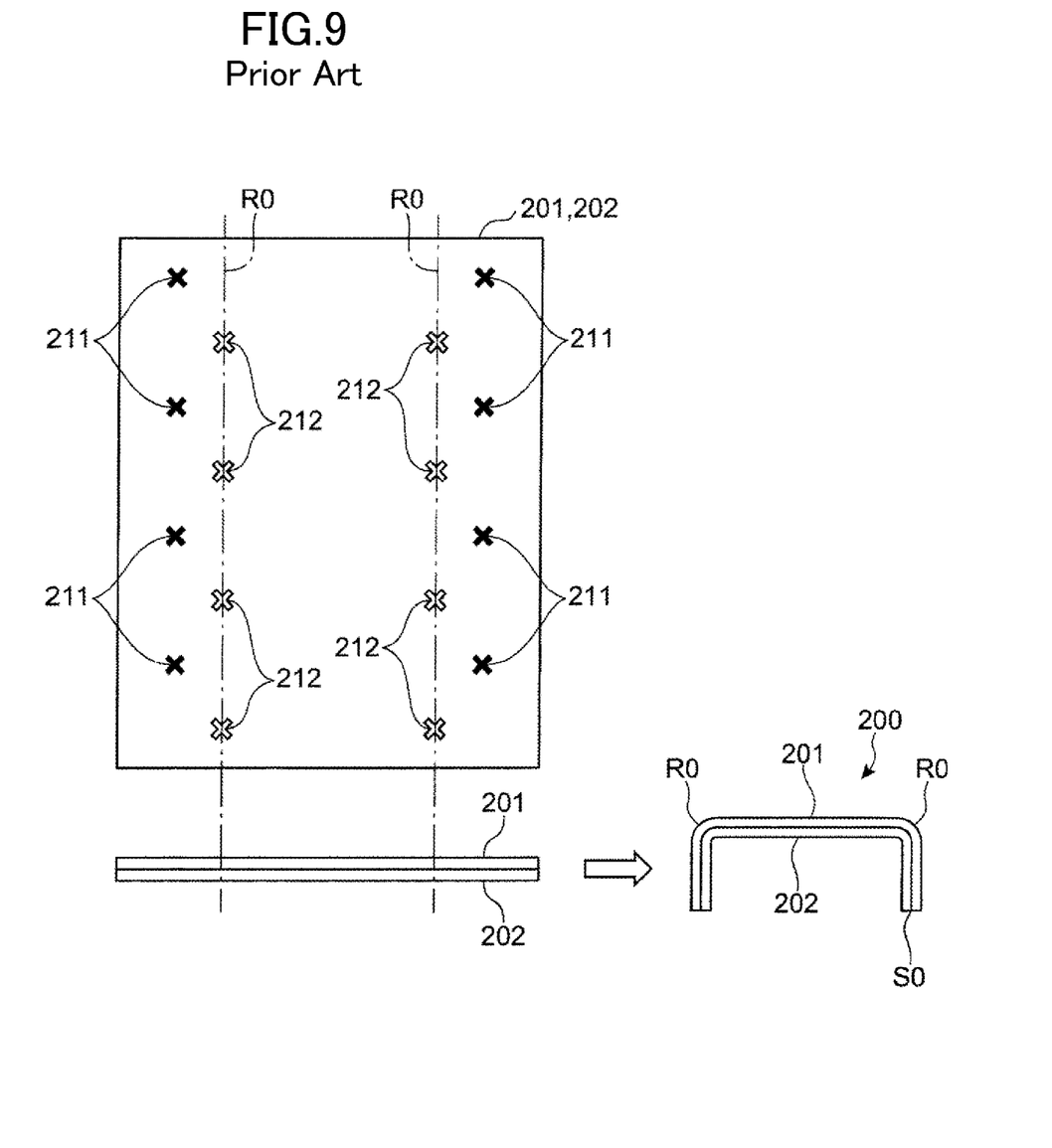
FIG. 9 is a diagram illustrating a joining process and a forming process of a conventional example.

For example, when manufacturing the vehicle body member 200 having the ridges R0 as shown in the right figure in FIG. 9, the sheet materials 201, 202 are usually welded at points located laterally outside the portion where the ridges R0 are formed, like at joints 211 shown in the left figure in FIG. 9. In this case, the vehicle body member 200 after press forming may have a deformed weld 221 as shown in the sectional view of FIG. 10A. In this case, the diameter (nugget diameter) of the weld 221 in a joint surface S0 is reduced, and bonding strength at the weld 221 is reduced.

Figure 10A:
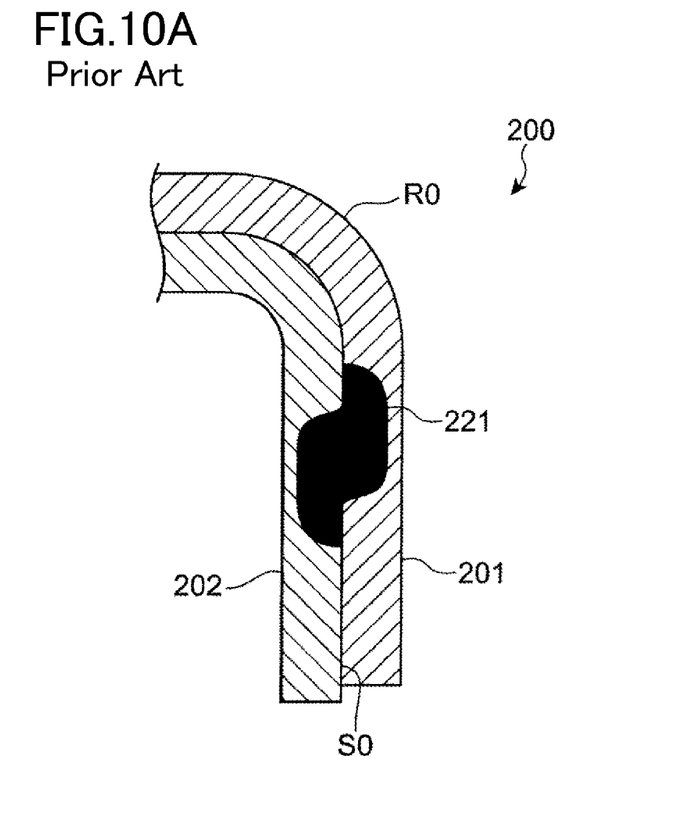
FIG. 10A is a diagram showing an example of how a weld is deformed by a forming process.

For example, such deformation of the weld 221 can be caused for the following reason. Since the sheet materials 201, 202 have different radii of curvature at the ridge R0, the sheet materials 201, 202 are displaced relative to each other in the direction along the joint surface S0 in a section as viewed in the longitudinal direction of the ridge R0, and the sheet materials 201, 202 are also extended by different amounts in the bent portion.

Figure 10B:
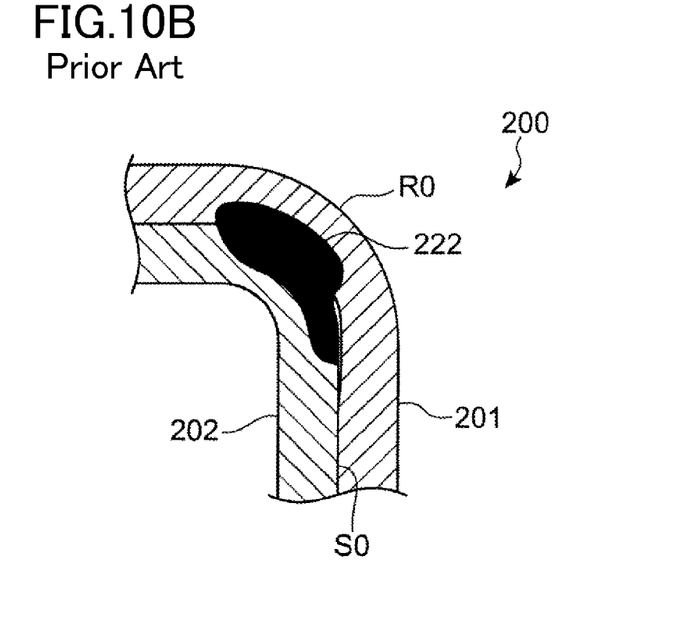
FIG. 10B is a diagram showing another example of how a weld is deformed by a forming process.

The sheet materials 201, 202 may be welded in the portions where the ridges R0 are formed, like at joints 212 shown in the left figure in FIG. 9. In this case, as shown in the sectional view of FIG. 10B, a weld 222 tends to be deformed less than the weld 221 shown in FIG. 10A, but the weld 222 is still deformed to such an extent that causes reduction in nugget diameter. Accordingly, measures such as increasing the number of welds need to be taken in order to provide required bonding strength.

In the technique of Japanese Unexamined Patent Publication No. 2017-140636, deformation of welds is restrained by performing hot press forming after hardening the welds and their surrounding regions by cooling. In this case, however, addition of the cooling process increases the number of person-hours and tends to degrade formability in the cooled portions.

It is an object of the present disclosure to improve both productivity and qualities such as forming accuracy and bonding strength of vehicle body members for vehicles which are formed by a plurality of sheet materials placed on top of each other.

In order to solve the above problems, a method for manufacturing a vehicle body member and a vehicle body member for a vehicle according to the present disclosure are configured as follows.

A first technique disclosed herein is a method for manufacturing a vehicle body member in which a second sheet material is placed on and joined to a first sheet material and a joined sheet material formed by the joining of the first and second sheet members is press formed into a vehicle body member with a predetermined shape, including: a joining step of joining the second sheet material to the first sheet material by welding at a plurality of points including a first joint and a second joint which are separated from each other, thereby forming the joined sheet material; a forming step of press forming the joined sheet material so that a ridge crossing an imaginary line segment connecting the first joint and the second joint is formed in a portion where the first sheet material overlaps the second sheet material; and a preparation step of, before the joining step, forming a displacement facilitating portion, which facilitates displacement of the second sheet material relative to the first sheet material in a longitudinal direction of the imaginary line segment, in a portion corresponding to between the first joint and the second joint in the second sheet material.

According to a second technique, in the first technique, the displacement facilitating portion includes an opening.

According to a third technique, in the first or second technique, the first sheet material is an elongated member extending in a predetermined direction, in the forming step, the joined sheet material is formed so as to form two of the ridges extending in a longitudinal direction of the first sheet material on both sides of the displacement facilitating portion and a wall connecting the two ridges, and in the preparation step, the displacement facilitating portion is formed in a portion corresponding to the wall in the second sheet material.

According to a fourth technique, in the third technique, the displacement facilitating portion includes a slot extending in the longitudinal direction of the first sheet material.

According to a fifth technique, in the fourth technique, a plurality of the slots that are located next to each other at intervals in the longitudinal direction of the first sheet material are formed in the second sheet material in the preparation step.

According to a sixth technique, in the fifth technique, the second sheet material is welded to the first sheet material at a third joint located between adjacent ones of the slots in the joining step.

According to a seventh technique, in any one of the first to sixth techniques, the method further includes: a heating step of heating the joined sheet material after the joining step and before the forming step.

According to an eighth technique, in a vehicle body member for a vehicle which includes a body member having a predetermined ridge portion, and a reinforcing member placed on and welded to a part of the body member which includes the ridge portion, a joint of the reinforcing member to the body member includes a first joint located on one side of the ridge portion or on the ridge portion, and a second joint located on the other side of the ridge portion, and the reinforcing member has, in a portion between the ridge portion and the second joint, a displacement facilitating portion that facilitates displacement of the reinforcing member relative to the body member in a longitudinal direction of an imaginary line segment connecting the first joint and the second joint.

According to a ninth technique, in the eighth technique, the displacement facilitating portion includes an opening.

According to a tenth technique, in the eighth or ninth technique, the body member is an elongated member having a wall extending in a predetermined direction and two of the ridge portions formed along edges on one side and the other side in a lateral direction of the wall so as to extend in a longitudinal direction of the wall, and the displacement facilitating portion is formed in a part of the reinforcing member which is placed on the wall.

According to an eleventh technique, in the tenth technique, the displacement facilitating portion includes a plurality of slots formed so as to extend in a longitudinal direction of the body member and located next to each other at intervals in the longitudinal direction of the body member.

According to a twelfth technique, in any one of the eighth to eleventh techniques, the body member is a pillar body member disposed on a side of a vehicle body so as to extend in a vertical direction of the vehicle body, and the reinforcing member is a pillar reinforcing member that reinforces the ridge portion of the pillar body member.

In the method for manufacturing a vehicle body member of the first technique, when the ridge crossing the imaginary line segment connecting the first joint and the second joint is formed in the joined sheet material in the forming step, displacement of the second sheet material relative to the first sheet material is facilitated in the portion between the first and second joints. This restrains relative displacement at the first and second joints, and therefore restrains such deformation of welds that causes reduction in nugget diameter in the first and second joints and thus restrains reduction in bonding strength in each weld. Accordingly, satisfactory bonding strength between the first sheet material and the second sheet material is more easily achieved while restraining an increase in number of welds in the joining step.

Since the forming step is performed after the joining step, both improvement in formability and reduction in number of person-hours required for pressing are achieved. Moreover, since the displacement facilitating portion is formed in the preparation step, both reduction in number of person-hours required for welding in the joining step and improvement in bonding strength are achieved. A high-quality vehicle body member can therefore be produced efficiently.

In the second technique, when the ridge is formed in the forming step, a peripheral edge of the opening formed in advance in the second sheet material is displaced in the longitudinal direction of the imaginary line segment connecting the first joint and the second joint. This restrains displacement of the second sheet material relative to the first sheet material at the first joint and the second joint. Reduction in bonding strength can thus be specifically restrained.

In the third technique, when the two ridges and the wall connecting the two ridges are formed in the joined sheet material in the forming step, displacement of the second sheet material relative to the first sheet material is facilitated in the wall. Reduction in bonding strength in the first joint and the second joint can thus be specifically restrained.

In the fourth technique, a peripheral edge of the slot formed in advance in the second sheet material can be effectively displaced between the first joint and the second joint in the forming step. This effectively facilitates displacement of the second sheet material relative to the first sheet material in the wall of the joined sheet material. Reduction in bonding strength in the first joint and the second joint can thus be specifically restrained.

In the fifth technique, the plurality of slots that are located next to each other at intervals in the longitudinal direction of the first sheet material are formed in the second sheet material in the preparation step. Reduction in bonding strength in the first joint and the second joint can thus be specifically restrained in an extensive range in the longitudinal direction of the joined sheet material.

In the sixth technique, the second sheet material is welded to the first sheet material at a third joint located between adjacent ones of the slots in the joining step. This restrains a gap from being formed between the first sheet material and the second sheet material around each slot.

In the seventh technique, formability of the joined sheet material is improved by the heating step, and in the forming step, hot press forming is performed on the joined sheet material having improved formability. Displacement of the second sheet material relative to the first sheet material due to the function of the displacement facilitating portion is thus more effectively facilitated in the forming step. Good formability is achieved by hot press forming even when high tensile steel sheets with poor cold formability etc. are used as the first and second sheet materials. A vehicle body member with various excellent qualities such as strength, rigidity, formability, and bonding strength can be manufactured.

The vehicle body member for a vehicle of the eighth technique has effects similar to those of the first technique in the case where the vehicle body member is manufactured by sequentially performing: a joining step of joining the body member and the reinforcing member by welding at a plurality of points including the first joint and the second joint, thereby forming a joined sheet material; and a forming step of press forming the joined sheet material so as to form a ridge.

The vehicle body member for a vehicle according to the ninth technique has effects similar to those of the second technique.

The vehicle body member for a vehicle according to the tenth technique has effects similar to those of the third technique.

The vehicle body member for a vehicle according to the eleventh technique has effects similar to those of the fifth technique.

The twelfth technique has the above effects for a pillar member including the pillar body member and the pillar reinforcing member.

DETAILED DESCRIPTION

A side vehicle body structure according to an embodiment of the present disclosure will be described with reference to the accompanying drawings. In the following description, the terms describing directions such as "front," "rear," "right," "left," "upper," and "lower" refer to the directions of a vehicle body in the case where the traveling direction of a vehicle at the time the vehicle travels forward is defined as "forward," unless otherwise specified. In the drawings, "X" represents the lateral direction of the vehicle body, "Y" represents the longitudinal direction of the vehicle body, and "Z" represents the vertical direction of the vehicle body.

General Configuration

Figure 1:
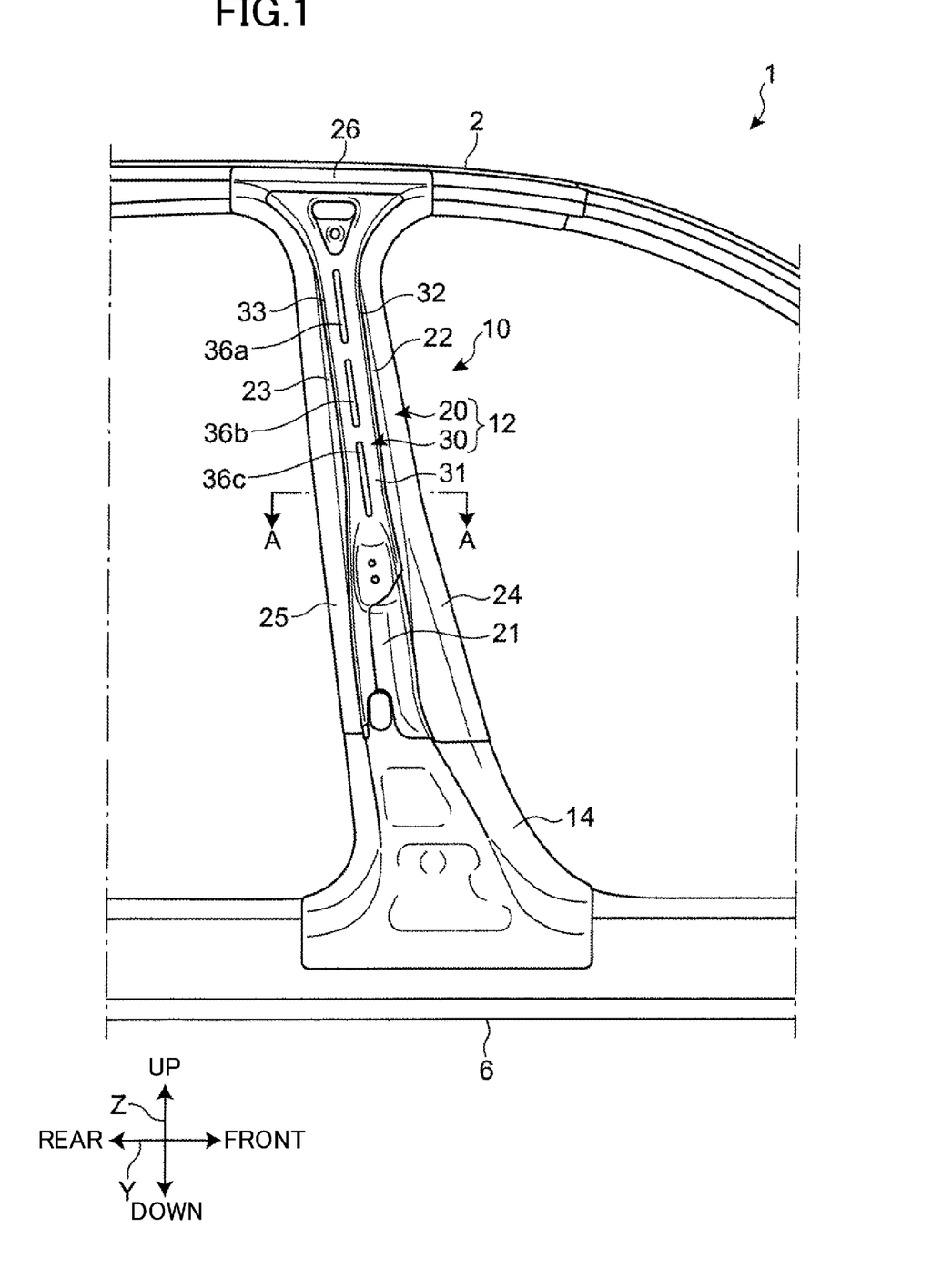
FIG. 1 is a side view of a side vehicle body structure including a vehicle body member for a vehicle according to an embodiment of the present disclosure.

FIG. 1 is a side view showing a side body structure of an automobile 1 including an outer pillar member 12 as a vehicle body member for a vehicle according to an embodiment of the present disclosure. In order to facilitate understanding of the invention, a pillar garnish exposed to the outside of a passenger compartment is not shown in FIG. 1.

As shown in FIG. 1, a roof side rail 2, a side sill 6, and a center pillar 10 are disposed on the side of a body of the automobile 1. The roof side rail 2 extends in the longitudinal direction Y of the body along the side of a roof panel (not shown). The side sill 6 extends in the longitudinal direction of the body along the side of a floor panel (not shown). The center pillar 10 is disposed so as to extend in the vertical direction Z of the body and couples the roof side rail 2 and the side sill 6.

Figure 2:
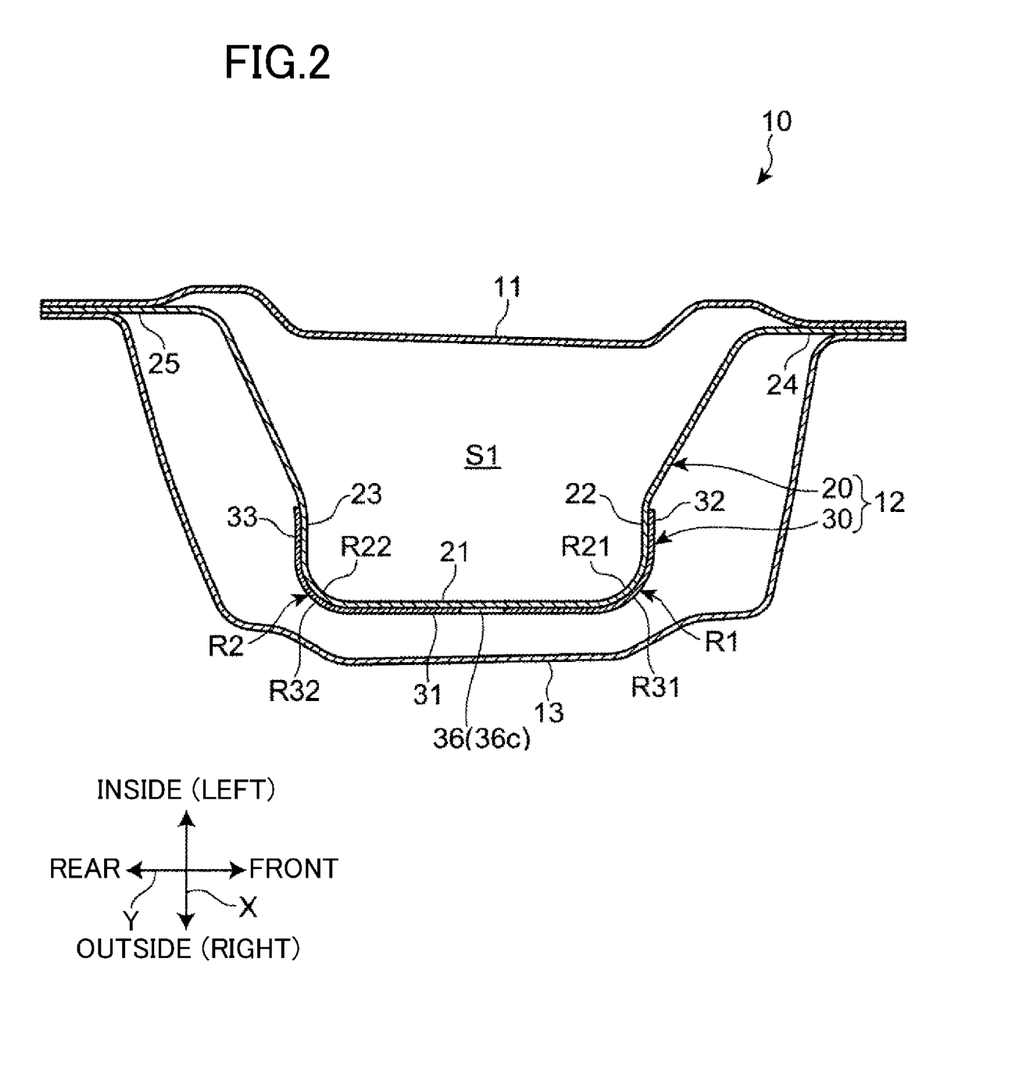
FIG. 2 is a sectional view taken along line A-A in FIG. 1, showing a sectional shape of a center pillar.

As shown in the sectional view of FIG. 2, the center pillar 10 includes an inner pillar member 11 and the outer pillar member 12 which are joined together. The inner pillar member 11 and the outer pillar member 12 are elongated members extending in the vertical direction Z of the body.

The inner pillar member 11 has a generally flat sectional shape as viewed in the vertical direction Z of the body. The outer pillar member 12 is disposed on the outer side of the inner pillar member 11 in the lateral direction X of the body. The outer pillar member 12 is joined along its front and rear edges to the inner pillar member 11. A closed section S1 that is continuous in the vertical direction Z of the body is thus formed between the inner pillar member 11 and the outer pillar member 12.

An outer panel 13, which is a pillar garnish, covers the outer pillar member 12 from the outside in the lateral direction X of the body. The outer panel 13 together with the outer pillar member 12 is joined along its front and rear edges to the inner pillar member 11. The outer panel 13 is not shown in FIG. 1.

Outer Pillar Member

Figure 3:
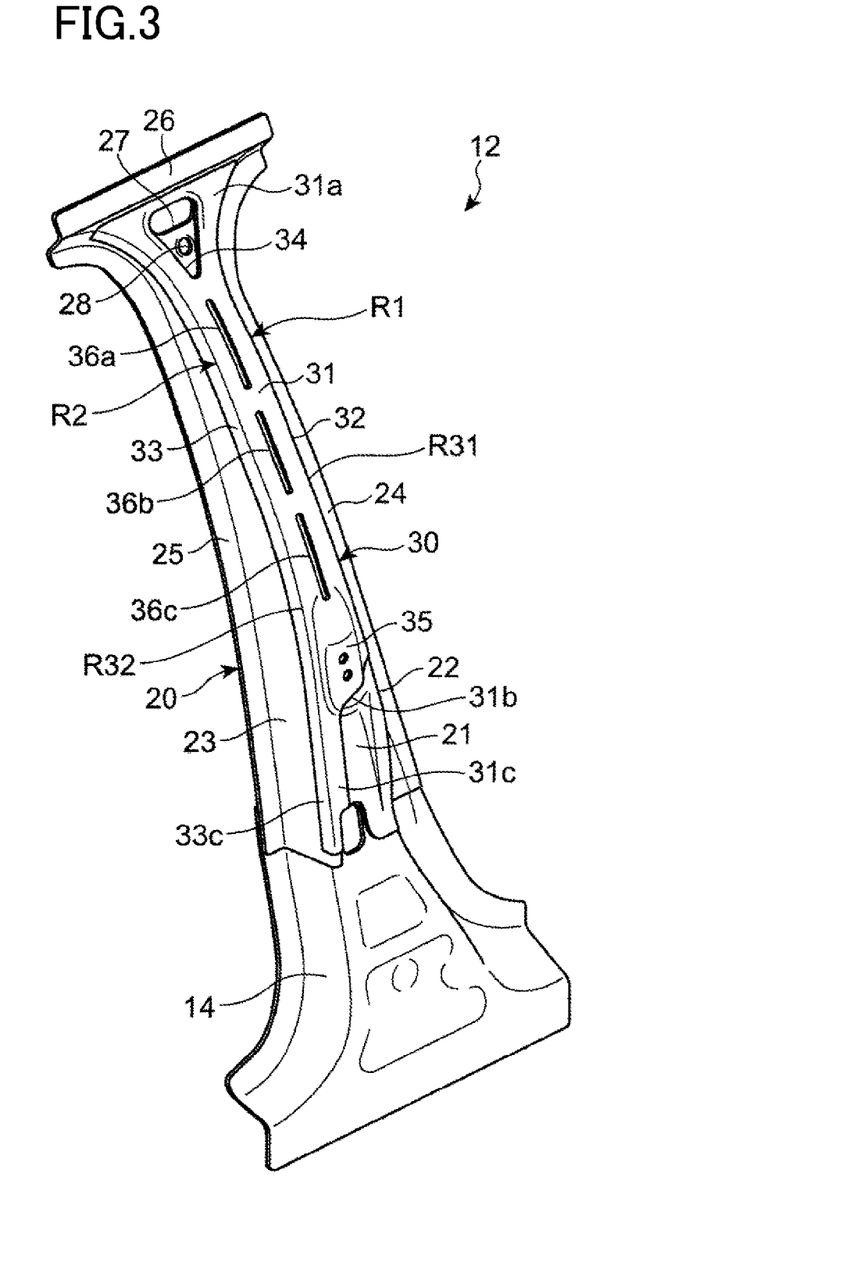
FIG. 3 is a perspective view of an outer pillar member.

As shown in FIGS. 2 and 3, the outer pillar member 12 includes a pillar body member 20 and a pillar reinforcing member 30. The pillar body member 20 is an elongated member extending in the vertical direction Z of the body. The pillar reinforcing member 30 reinforces the pillar body member 20. The outer pillar member 12 further includes a lower extension member 14 connected to the lower end of the pillar body member 20. However, the lower extension member 14 may be integral with the pillar body member 20. The pillar body member 20, the pillar reinforcing member 30, and the lower extension member 14 are made of, e.g., a steel sheet such as a high tensile steel sheet.

The outer pillar member 12 is generally formed with a hat-shaped section that opens inward in the lateral direction X of the body. The outer pillar member 12 thus has a first ridge R1 and a second ridge R2 on its outer side face in the lateral direction X of the body. The first ridge R1 and the second ridge R2 extend in the longitudinal direction of the outer pillar member 12. The first ridge R1 has a curved upper end that extends obliquely upward toward the front such that its tip end is located closest to the front. The second ridge R2 has a curved upper end that extends obliquely upward toward the rear such that its tip end is located closest to the rear.

The pillar body member 20 includes a side face portion 21, a front face portion 22, a rear face portion 23, a front flange portion 24, and a rear flange portion 25. The side face portion 21 faces the outer side of the inner pillar member 11 in the lateral direction X of the body. The front face portion 22 extends inward in the lateral direction X of the body from the front edge of the side face portion 21. The rear face portion 23 extends inward in the lateral direction X of the body from the rear edge of the side face portion 21. The front flange portion 24 extends toward the front of the body from the inner edge of the front face portion 22 in the lateral direction X of the body. The rear flange portion 25 extends toward the rear of the body from the inner edge of the rear face portion 23 in the lateral direction X of the body.

As shown in FIG. 2, the pillar body member 20 is a member with a hat-shaped section that opens inward in the lateral direction X of the body. The pillar body member 20 is joined along the front and rear flange portions 24, 25 to the inner pillar member 11 by, e.g., welding. The closed section S1 is thus formed between the pillar body member 20 and the inner pillar member 11.

As shown in FIG. 3, the side face portion 21, the front face portion 22, the rear face portion 23, the front flange portion 24, and the rear flange portion 25 of the pillar body member 20 are walls extending along substantially the entire length of the pillar body member 20. The pillar body member 20 further includes an upper flange portion 26 in its upper end. The upper flange portion 26 extends in the longitudinal direction Y of the body along the upper edge of the side face portion 21. The upper flange portion 26 is joined to the outer side face of the roof side rail 2 in the lateral direction X of the body by, e.g., welding (see FIG. 1). The pillar body member 20 further has an assembly opening 27 and a positioning hole 28 near the upper end of the side face portion 21. The assembly opening 27 and the positioning hole 28 are used when assembling the body.

As shown in FIG. 2, the pillar body member 20 has a ridge portion R21 along the front edge of the side face portion 21, namely in the corner between the side face portion 21 and the front face portion 22, and a ridge portion R22 along the rear edge of the side face portion 21, namely in the corner between the side face portion 21 and the rear face portion 23. The ridge portion R21 extends in the vertical direction Z of the body so as to form the first ridge R1, and the ridge portion R2 extends in the vertical direction Z of the body so as to form the second ridge R2.

As shown in FIGS. 2 and 3, the pillar reinforcing member 30 is placed on the outer surface of the pillar body member 20 as viewed from the passenger compartment. The pillar reinforcing member 30 is joined to the pillar body member 20 by welding.

The pillar reinforcing member 30 includes a side-face reinforcing portion 31, a front-face reinforcing portion 32, and a rear-face reinforcing portion 33. The side-face reinforcing portion 31 is placed on the side face portion 21 of the pillar body member 20, the front-face reinforcing portion 32 is placed on the front face portion 22 of the pillar body member 20, and the rear-face reinforcing portion 33 is placed on the rear face portion 23 of the pillar body member 20. The front-face reinforcing portion 32 extends inward in the lateral direction X of the body from the front edge of the side-face reinforcing portion 31. The rear-face reinforcing portion 33 extends inward in the lateral direction X of the body from the rear edge of the side-face reinforcing portion 31. The pillar reinforcing member 30 thus has a U-shaped section that opens inward in the lateral direction X of the body.

The pillar reinforcing member 30 has a ridge portion R31 in the corner between the side-face reinforcing portion 31 and the front-face reinforcing portion 32, and a ridge portion R32 in the corner between the side-face reinforcing portion 31 and the rear-face reinforcing portion 33. The ridge portion R31 extends in the vertical direction Z of the body and is placed on the ridge portion R21 of the pillar body member 20. The ridge portion R32 also extends in the vertical direction Z of the body and is placed on the ridge portion R22 of the pillar body member 20.

The pillar reinforcing member 30 is thus placed on a part of the pillar body member 20 which includes the ridge portions R21, R22, whereby the ridge portions R21, R22 are effectively reinforced.

As shown in FIG. 3, the side-face reinforcing portion 31 is a long wall extending substantially from the upper end of the side face portion 21 to a position lower than the middle of the side face portion 21 in the longitudinal direction of the pillar body member 20 so as to connect the two ridge portions R31, R32. The front-face reinforcing portion 32 and the rear-face reinforcing portion 33 are also long walls extending in the longitudinal direction of the pillar body member 20 so as to correspond to the side-face reinforcing portion 31.

The pillar reinforcing member 30 has in the lower end of the side-face reinforcing portion 31 a fixed portion 35 to which a door hinge for a rear seat door (not shown) is fixed. The pillar reinforcing member 30 further has in its lower end a side-face extended portion 31c and a rear-face extended portion 33c which extend along the second ridge R2. The side-face extended portion 31c is an extension of the side-face reinforcing portion 31 which is extended downward in the vertical direction Z of the body beyond a lower edge 31b of the fixed portion 35. The rear-face extended portion 33c is an extension of the rear-face reinforcing portion 33 which is extended downward in the vertical direction Z of the body beyond the fixed portion 35.

The side-face reinforcing portion 31 has in its upper end an opening 34 having the shape of, e.g., an inverted triangle. The opening 34 is formed at a position corresponding to the assembly opening 27 and the positioning hole 28 of the pillar body member 20. The assembly opening 27 and the positioning hole 28 are thus exposed without being covered by the pillar reinforcing member 30.

The side-face reinforcing portion 31 has slots 36 (36a, 36b, 36c) extending in the longitudinal direction of the outer pillar member 12. The plurality of slots 36a, 36b, 36c are formed at intervals in the longitudinal direction of the outer pillar member 12. The slots 36a, 36b, 36c are formed between the opening 34 and the fixed portion 35 in the longitudinal direction of the outer pillar member 12. Each slot 36 is located substantially in the middle in the lateral direction of the side-face reinforcing portion 31.

Manufacture of Outer Pillar Member

An example of a method for manufacturing the outer pillar member 12 will be described with reference to FIG. 4.

Figure 4:
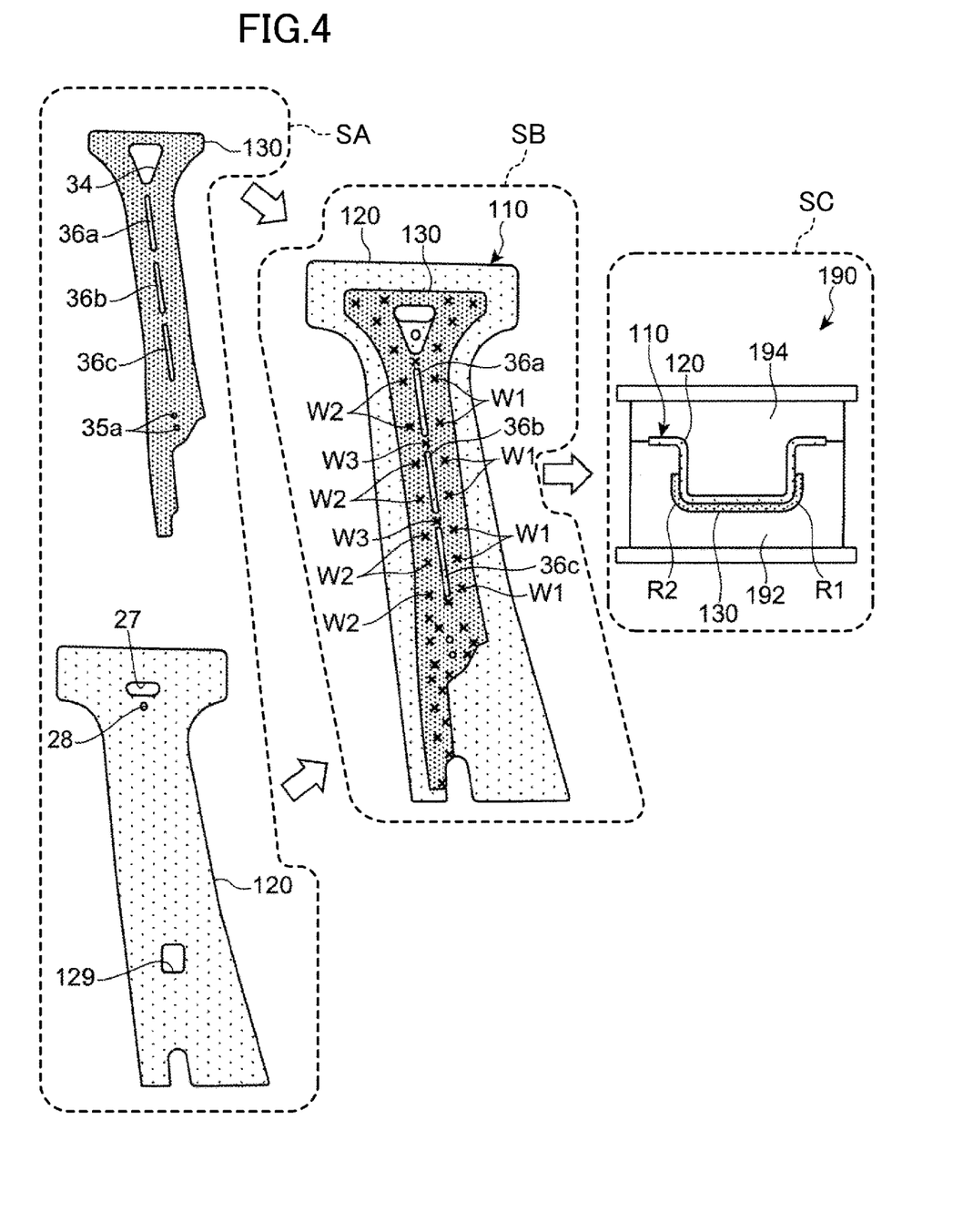
FIG. 4 is a diagram illustrating a manufacturing process of the outer pillar member.

The outer pillar member 12 is manufactured through a preparation process shown by SA in FIG. 4, a joining process shown by SB in FIG. 4, a heating process, and a forming process shown by SC in FIG. 4.

In the preparation process shown by SA in FIG. 4, a first sheet material 120 and a second sheet material 130 are prepared as a raw material for the pillar body member 20 and a raw material for the pillar reinforcing member 30, respectively. Although an additional sheet material is also prepared as a raw material for the lower extension member 14 (see FIG. 3) in the preparation process, this sheet material is not shown in FIG. 4 and description thereof will be omitted.

In the preparation process, flat sheet materials sheared into predetermined elongated shapes by a press machine are prepared as the first sheet material 120 and the second sheet material 130. Specifically, the first sheet material 120 having an assembly opening 27 and a positioning hole 28 in a portion corresponding to the side face portion 21 and having an opening 129 at a position corresponding to the fixed portion 35 of the pillar reinforcing member 30 is prepared in the preparation process. The second sheet material 130 having an opening 34, slots 36a, 36b, 36c, and bolt holes 35a of the fixed portion 35 in a portion corresponding to the side-face reinforcing portion 31 is prepared in the preparation process.

In the joining process shown by SB in FIG. 4, the second sheet material 130 is placed on a predetermined position of the first sheet material 120, and the first sheet material 120 and the second sheet material 130 are joined at a plurality of points by spot welding. The first sheet material 120 and the second sheet material 130 are positioned and joined such that the longitudinal direction of the first sheet material 120 matches that of the second sheet material 130. A joined sheet material 110 formed by joining the first and second sheet materials 120, 130 is formed in this manner.

Although the sheet material as a raw material for the lower extension member 14 (see FIG. 3) is also joined to the first sheet material 120 in the joining process and forms a part of the joined sheet material 110, this sheet material is not shown in FIG. 4 and description thereof will be omitted.

The joints in the joined sheet material 110 include a plurality of first joints W1 located on one side of the slots 36a, 36b, 36c in the lateral direction (width direction) of the joined sheet material 110, a plurality of second joints W2 located on the other side of the slots 36a, 36b, 36c in the lateral direction (width direction) of the joined sheet material 110, and third joints W3 each located between adjacent ones of the slots 36a, 36b, 36c in the longitudinal direction of the joined sheet material 110.

After the joining process is completed, the heating process of heating the joined sheet material 110 is performed, and hot press forming is performed with a press machine 190 in the forming process shown by SC in FIG. 4.

In the heating process, the joined sheet material 110 is softened by heating to a predetermined temperature (e.g., about 900° C.). Formability of the joined sheet material 110 is thus improved. Since the forming process is performed on the joined sheet material 110 having improved formability, the joined sheet material 110 can be accurately formed into a predetermined three-dimensional shape. This method reduces the possibility of unsatisfactory dimensional accuracy due to springback etc. even when high tensile steel sheets with poor cold formability are used as the first and second sheet materials 120, 130.

In the forming process shown by SC in FIG. 4, the joined sheet material 110 is placed between a die 192 and a punch 194 of the press machine 190 and formed into a predetermined shape. Specifically, the joined sheet material 110 is formed so that the first sheet material 120 has a hat-shaped section and the second sheet material 130 has a U-shaped section. A first ridge R1 and a second ridge R2 which extend in the longitudinal direction of the joined sheet material 110 are formed in the portion where the first sheet material 120 overlaps the second sheet material 130.

In the forming process, the joined sheet material 100 is cooled by contact with the die 192 and the punch 194. The joined sheet material 100 is thus strengthened by quenching. A high-strength outer pillar member 12 (see FIG. 3) is formed in this manner.

As described above, when manufacturing the outer pillar member 12, the forming process is performed after the joining process. This improves formability so that the pillar reinforcing member 30 conforms to the shape of the pillar body member 20, and also reduces the number of person-hours required for pressing.

Functions and Effects

Functions and effects of the present embodiment will be described with reference to FIGS. 5 to 7. In the following description, the longitudinal directions of the outer pillar member 12, the pillar body member 20, and the pillar reinforcing member 30 are simply referred to as the "longitudinal direction D1," and the lateral directions (width directions) of the outer pillar member 12, the pillar body member 20, and the pillar reinforcing member 30 are simply referred to as the "lateral direction D2."

Figure 5:
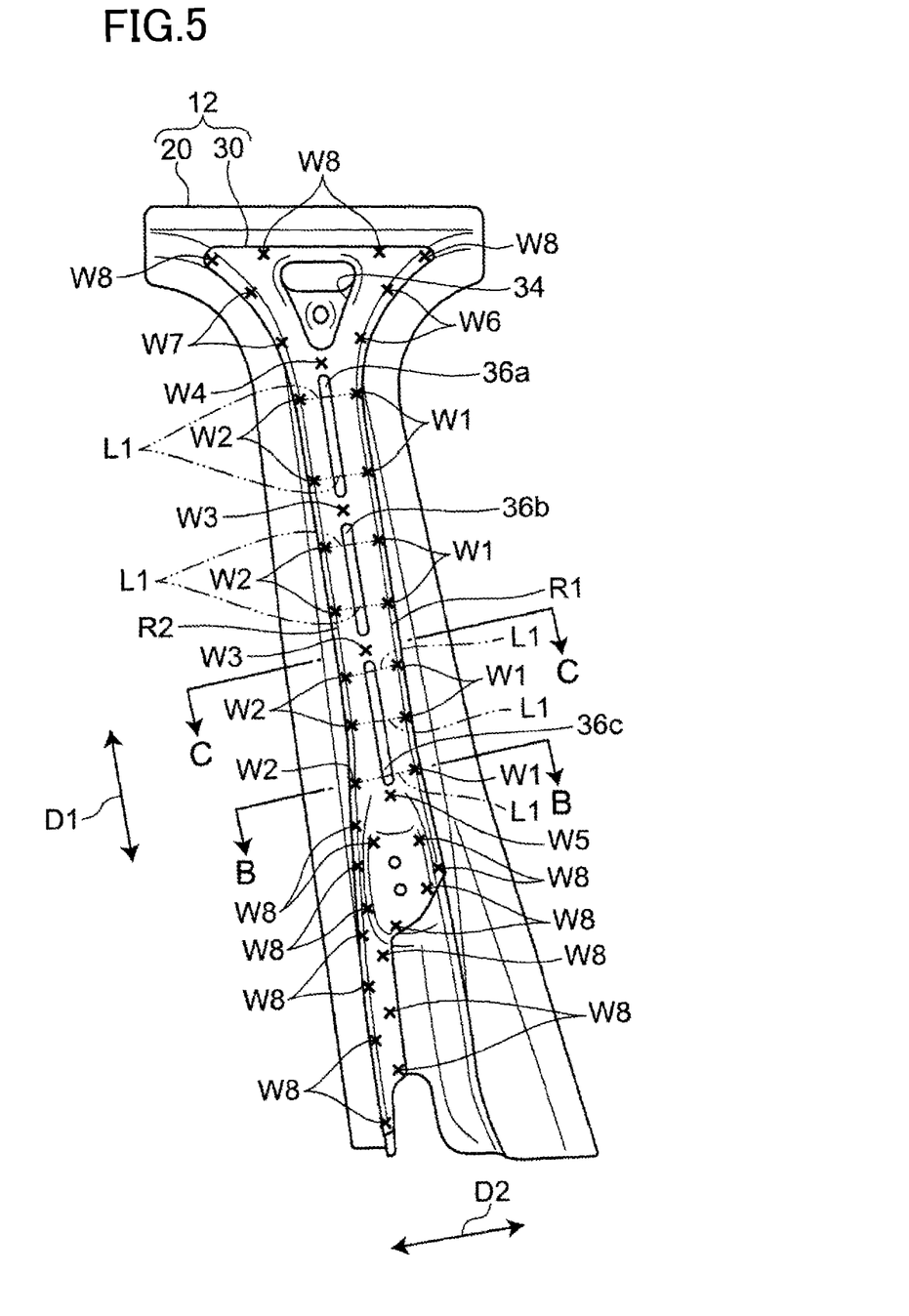
FIG. 5 is a side view showing an example of joints of the outer pillar member.

As shown in FIG. 5, in the outer pillar member 12 manufactured as described above, the joints between the pillar body member 20 and the pillar reinforcing member 30 by welding include, in addition to the first joints W1, the second joints W2, and the third joints W3, a fourth joint W4 located between the upper slot 36a and the opening 34 of the pillar reinforcing member 30, a fifth joint W5 located between the lower slot 36c and the fixed portion 35 of the pillar reinforcing member 30, sixth joints W6 located on the one side of the opening 34 in the lateral direction D2, seventh joints W7 located on the other side of the opening 34 in the lateral direction D2, and other joints W8.

A plurality of the first joints W1 and a plurality of the second joints W2 are located in each of the regions in the longitudinal direction D1 where each slot 36 is located. A single second joint W2 is provided for each first joint W1 at substantially the same position or an adjacent position in the longitudinal direction D1. The first joints W1 and the second joints W2 are thus in one-to-one correspondence. A corresponding pair of first and second joints W1, W2 are located next to each other in the lateral direction D2 with the slot 36 interposed therebetween.

In the present embodiment, the first joints W1 are located on the first ridge R1, and the second joints W2 are located on the second ridge R2. However, the first joints W1 may be formed outside the first ridge R1 in the lateral direction D2, and the second joints W2 may be formed outside the second ridge R2 in the lateral direction D2. That is, in the forming process (see SC in FIG. 4), the first ridge R1 and the second ridge R2 are formed so as to cross imaginary line segments L1 each connecting a corresponding pair of first and second joints W1, W2.

Figure 6:
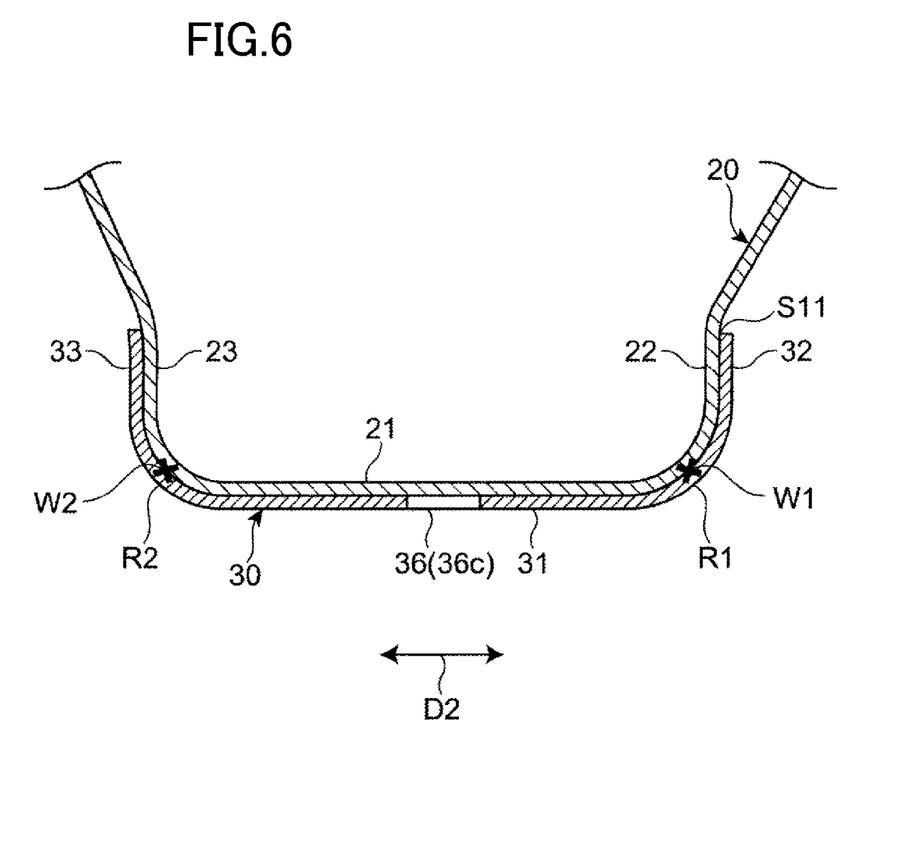
FIG. 6 is a sectional view taken along line B-B in FIG. 5, showing a sectional shape of the outer pillar member at a predetermined positon.

FIG. 6 is a sectional view showing a sectional shape of the outer pillar member 12 at the position of the imaginary line segment L1 (see FIG. 5) in the longitudinal direction D1. As shown in FIG. 6, the slot 36 formed in the side-face reinforcing portion 31 of the pillar reinforcing member 30 is located between a corresponding pair of first and second joints W1, W2.

In manufacture of the outer pillar member 12, each slot 36 is formed in the above position in the preparation process (see SA in FIG. 4), and the first joints W1 and the second joints W2 are formed in the joining process (see SB in FIG. 4). The positional relationship between the slots 36 and the first and second joint positions W1, W2 has therefore already been established when the forming process (see SC in FIG. 4) is performed.

Accordingly, when the first and second ridges R1, R2 that cross the imaginary line segments L1 (see FIG. 5) are formed in the forming process, the second sheet material 130 (see FIG. 4) that is a raw material for the pillar reinforcing member 30 can be deformed so as to slightly widen the slots 36 in the longitudinal direction of the imaginary line segments L1 (the lateral direction D2). Moreover, since the forming process is performed in a hot state, this facilitates deformation of the peripheral edges of the slots 36 in the pillar reinforcing member 30.

The slots 36 thus function as displacement facilitating portions. Namely, the slots 36 facilitate displacement of each portion between the first joint W1 and the slot 36 and each portion between the second joint W2 and the slot 36 in the lateral direction D2 in the second sheet material 130 relative to the first sheet material 120 that is a raw material for the pillar body member 20.

According to the present embodiment, in the forming process, relative displacement between the first and second sheet materials 120, 130, which is caused by the difference in radius of curvature between the pillar body member 20 and the pillar reinforcing member 30 along the first ridge R1 and the second ridge R2, is thus facilitated in the portion between the first and second joints W1, W2 in the second sheet material 130. Relative displacement between the sheet materials 120, 130 is therefore restrained in the first joints W1 and the second joints W2. This restrains such deformation of the welds that causes reduction in nugget diameter in a joint surface S11 and thus restrains reduction in bonding strength in the first joints W1 and the second joints W2.

In the present embodiment, as shown in FIG. 5, the sixth joints W6 are located on the first ridge R1 or outside the first ridge R1 in the lateral direction D2, and the seventh joints W7 are located on the second ridge R2 or outside the second ridge R2 in the lateral direction D2. The opening 34 is formed between the sixth and seventh joints W6, W7 in the pillar reinforcing member 30.

The positional relationship between the opening 34 and the sixth and seventh joints W6, W7 is therefore similar to that between the slots 36 and the first and second joint positions W1, W2. The opening 34 can thus similarly function as a displacement facilitating portion. This effectively restrains reduction in bonding strength in the sixth joints W6 and the seventh joints W7.

According to the present embodiment, satisfactory bonding strength between the first sheet material 120 and the second sheet material 130 is more easily achieved while restraining an increase in number of welds in the joining process (see SB in FIG. 4). Both reduction in number of person-hours required for the joining process and improvement in bonding strength can thus be achieved. Accordingly, the outer pillar member 12 with various excellent qualities such as strength, rigidity, formability, and bonding strength can be efficiently produced.

Figure 7:
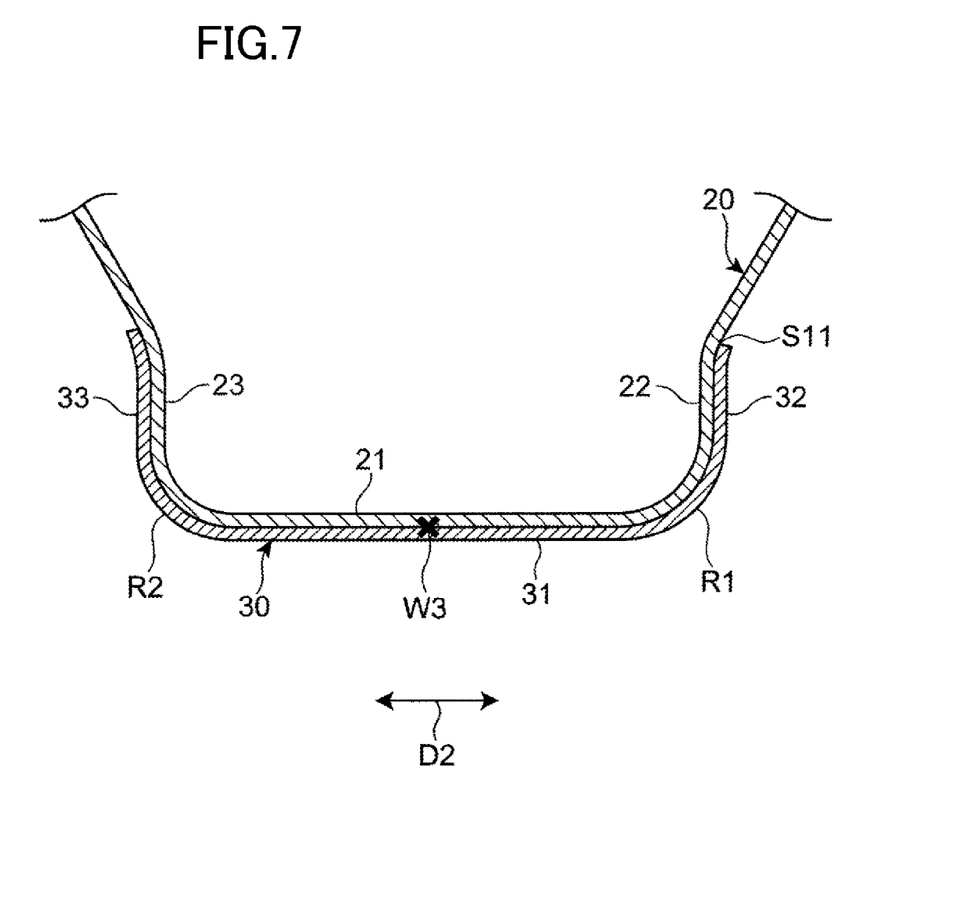
FIG. 7 is a sectional view taken along line C-C in FIG. 5, showing a sectional shape of the outer pillar member at another position.

As shown in FIG. 7, at the position between adjacent ones of the slots 36 in the longitudinal direction D1, the pillar body member 20 and the pillar reinforcing member 30 are joined at the third joint W3. Similarly, in the portion located above and adjacent to the upper slot 36a, the pillar body member 20 and the pillar reinforcing member 30 are joined at the fourth joint W4, and in the portion located below and adjacent to the lower slot 36c, the pillar body member 20 and the pillar reinforcing member 30 are joined at the fifth joint W5 (see FIG. 5). This restrains a gap from being formed between the side face portion 21 of the pillar body member 20 and the side-face reinforcing portion 31 of the pillar reinforcing member 30 around each slot 36.

Figure 8:
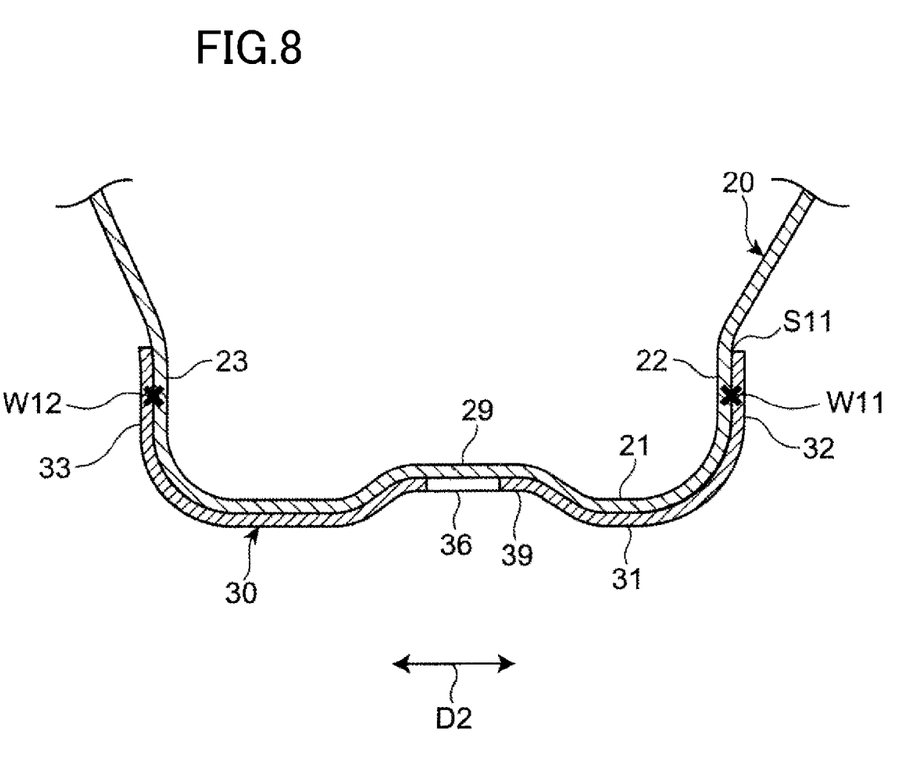
FIG. 8 is a sectional view similar to FIG. 6, showing a sectional shape of an outer pillar member according to a modification.

As shown in a modification of FIG. 8, in the side face portion 21 of the pillar body member 20, a recessed portion 29 for improving flexural rigidity may be formed in the shape of a groove extending in the longitudinal direction D1 (see FIG. 5). A similar recessed portion 39 conforming to the recessed portion 29 may be formed in the side-face reinforcing portion 31 of the pillar reinforcing member 30. In this case, the slots 36 may be formed in the recessed portion 39 of the side-face reinforcing portion 31. In this case, the slots 36 can function as displacement facilitating portions that are similar to those described above.

In the modification shown in FIG. 8, first joints W11 are formed so as to join the front face portion 22 of the pillar body member 20 and the front-face reinforcing portion 32 of the pillar reinforcing member 30, and second joints W12 are formed so as to join the rear face portion 23 of the pillar body member 20 and the rear-face reinforcing portion 33 of the pillar reinforcing member 30. Even when the first joints W11 and the second joints W12 are located as described above, reduction in bonding strength in the first joints W11 and the second joints W12 is effectively restrained as the slots 36 function as displacement facilitating portions.

Although the present disclosure is described with respect to the above embodiment, the present disclosure is not limited to the above embodiment.

For example, the above embodiment is described with respect to the example in which the slots 36 and the opening 34 are formed as displacement facilitating portions. In the present disclosure, however, the displacement facilitating portions may be either other openings or configurations other than openings. Specific examples of the displacement facilitating portions other than openings include thinned portions and grooves.

In the above embodiment, the present disclosure is described with respect to the configuration in which the pillar reinforcing member 30 is placed on the outer surface of the pillar body member 20. However, the present disclosure is also applicable to a configuration in which a reinforcing member is placed on the inner surface of a body member.

The above embodiment is described with respect to the example in which the present disclosure is applied to a pillar member. However, the present disclosure is also applicable to vehicle body members other than the pillar member, such as a roof side rail.

As described above, according to the present disclosure, both improvement in productivity and improvement in qualities such as forming accuracy and bonding strength can be achieved for vehicle body members for vehicles which are formed by placing a plurality of sheet materials on top of each other. The present disclosure can therefore be suitably used in the manufacturing industry of automobiles having this type of vehicle body member.

What is claimed is:

1. A method for manufacturing a vehicle body member in which a second sheet material is placed on and joined to a first sheet material, the first sheet material being an elongated member extending in a predetermined direction, and a joined sheet material formed by the joining of the first and second sheet members is press formed into a vehicle body member with a predetermined shape, comprising:

a joining step of joining the second sheet material to the first sheet material by welding at a plurality of points including a first joint and a second joint which are separated from each other, thereby forming the joined sheet material;

a forming step of press forming the joined sheet material so that two ridges a crossing an imaginary line segment connecting the first joint and the second joint are formed in a portion where the first sheet material overlaps the second sheet material; and a preparation step of, before the joining step, forming an opening serving as a displacement facilitating portion, which facilitates displacement of the second sheet material relative to the first sheet material in a longitudinal direction of the imaginary line segment, in a portion corresponding to between the first joint and the second joint in the second sheet material, wherein:

in the forming step, the two ridges are formed extending in a longitudinal direction of the first sheet material on two opposing sides of the opening and a wall connecting the two ridges, and in the preparation step, the opening is formed in a portion corresponding to the wall in the second sheet material.

2. The method of claim 1, wherein
the opening includes a slot extending in the longitudinal direction of the first sheet material.

3. The method of claim 2, wherein
in the preparation step, a plurality of the slots that are located next to each other at intervals in the longitudinal direction of the first sheet material are formed in the second sheet material.

4. The method of claim 3, wherein
in the joining step, the second sheet material is welded to the first sheet material at a third joint located between adjacent ones of the slots.

5. The method of claim 1, further comprising:
a heating step of heating the joined sheet material after the joining step and before the forming step.

6. The method of claim 1, wherein
the first sheet material is an elongated member extending in a predetermined direction, in the forming step, the joined sheet material is formed so as to form two of the ridges extending in a longitudinal direction of the first sheet material on both sides of the opening and a wall connecting the two ridges, and in the preparation step, the displacement facilitating portion opening is formed in a portion corresponding to the wall in the second sheet material.

7. A vehicle body member for a vehicle which includes a body member having a predetermined ridge portion, and a reinforcing member placed on and welded to a part of the body member which includes the ridge portion, wherein
the body member is an elongated member having a wall extending in a predetermined direction and two of the ridge portions formed along edges on one side and the other side in a lateral direction of the wall so as to extend in a longitudinal direction of the wall, a joint of the reinforcing member to the body member includes a first joint located on one side of the ridge portion or on the ridge portion, and a second joint located on the other side of the ridge portion, the reinforcing member has, in a portion between the ridge portion and the second joint, an opening serving as a displacement facilitating portion that facilitates displacement of the reinforcing member relative to the body member in a longitudinal direction of an imaginary line segment connecting the first joint and the second joint, and the opening is formed in a part of the reinforcing member which is placed on the wall.

8. The vehicle body member of claim 7, wherein
the opening includes a plurality of slots formed so as to extend in a longitudinal direction of the body member and located next to each other at intervals in the longitudinal direction of the body member, and the opening is positioned so as to be spaced from the ridge portion.

9. The vehicle body member of claim 8, wherein
the body member is a pillar body member disposed on a side of a vehicle body so as to extend in a vertical direction of the vehicle body, and the reinforcing member is a pillar reinforcing member that reinforces the ridge portion of the pillar body member.

10. The vehicle body member of claim 7, wherein
the body member is a pillar body member disposed on a side of a vehicle body so as to extend in a vertical direction of the vehicle body, and the reinforcing member is a pillar reinforcing member that reinforces the ridge portion of the pillar body member.

11. The vehicle body member of claim 10, wherein
the pillar reinforcing member includes
a side-face reinforcing portion placed on a side face portion of the pillar body member,
front-face reinforcing portion placed on a front face portion of the pillar body member, and
a rear-face reinforcing portion placed on a rear face portion of the pillar body member; and
the side-face reinforcing portion extends from an upper end of the side face portion to a position lower than a middle of the side face portion in a longitudinal direction of the pillar body member so as to connect the two ridge portions.

12. The vehicle body member of claim 11, wherein
a lower end of the side-face reinforcing portion is provided with a fixed portion to which a door hinge for a rear seat door is fixed.

13. The vehicle body member of claim 11, wherein
an upper end of the side-face reinforcing portion is provided with an opening having a shape of an inverted triangle.

14. The vehicle body member of claim 7, wherein
the body member is an elongated member having a wall extending in a predetermined direction and two of the ridge portions formed along edges on one side and the other side in a lateral direction of the wall so as to extend in a longitudinal direction of the wall, and the opening is formed in a part of the reinforcing member which is placed on the wall.

15. The vehicle body member of claim 14, wherein
the opening includes a plurality of slots formed so as to extend in a longitudinal direction of the body member and located next to each other at intervals in the longitudinal direction of the body member.

16. The vehicle body member of claim 15, wherein
the body member is a pillar body member disposed on a side of a vehicle body so as to extend in a vertical direction of the vehicle body, and
the reinforcing member is a pillar reinforcing member that reinforces the ridge portion of the pillar body member.

17. The vehicle body member of claim 14, wherein
the body member is a pillar body member disposed on a side of a vehicle body so as to extend in a vertical direction of the vehicle body, and
the reinforcing member is a pillar reinforcing member that reinforces the ridge portion of the pillar body member.

18. The vehicle body member of claim 7, wherein
the body member is a pillar body member disposed on a side of a vehicle body so as to extend in a vertical direction of the vehicle body, and
the reinforcing member is a pillar reinforcing member that reinforces the ridge portion of the pillar body member.

* * * * *